United States Patent [19] [11] 4,232,702
Geil [45] Nov. 11, 1980

[54] PRIMING APPARATUS FOR LIQUID INK WRITING INSTRUMENTS

[75] Inventor: Ronald J. Geil, Vermilion, Ohio

[73] Assignee: Gould Inc., Rolling Meadows, Ill.

[21] Appl. No.: 52,810

[22] Filed: Jun. 28, 1979

Related U.S. Application Data

[62] Division of Ser. No. 859,902, Dec. 12, 1977, Pat. No. 4,170,016.

[51] Int. Cl.³ .............................................. F16K 17/04
[52] U.S. Cl. ..................................... 137/115; 417/307
[58] Field of Search ....................... 137/115, 538, 494; 417/307, 311

[56] References Cited

U.S. PATENT DOCUMENTS

| | | | |
|---|---|---|---|
| 1,147,286 | 7/1915 | Welch | 417/307 |
| 3,455,322 | 7/1969 | Chichester | 137/115 |
| 3,548,867 | 12/1970 | Grisebach | 137/538 X |
| 3,687,153 | 8/1972 | Gold | 137/115 X |

FOREIGN PATENT DOCUMENTS

| | | | |
|---|---|---|---|
| 1078663 | 5/1954 | France | 137/538 |
| 519429 | 3/1940 | United Kingdom | 137/115 |

*Primary Examiner*—Robert G. Nilson
*Attorney, Agent, or Firm*—Charles E. Snee, III; Barry L. Tummino; Russell E. Baumann

[57] ABSTRACT

A system for priming liquid ink writing instruments such as ink jet writers and capillary ink pens is disclosed. A source of ink is pressurized to force ink through the ink jet or other pen so that a small droplet is formed at the jet or pen outlet. As the drop forms at the jet or pen, it is eventually drawn away into an adjacent orifice, due to capillary action. An integrated priming pump serves both to pressurize the ink source to form the ink droplet and to apply a vacuum to the orifice to remove the ink drawn away by capillary action. A pressure release valve ensures that the ink jet or pen is not overpressurized during priming. In ink jet applications, the drop removal orifice is formed as a portion of the droplet charging ring.

1 Claim, 6 Drawing Figures

PRIMING APPARATUS FOR LIQUID INK WRITING INSTRUMENTS

This is a division of application Ser. No 859,902, filed Dec. 12, 1977, now U.S. Pat. No. 4,170,016.

BACKGROUND OF THE INVENTION

In the printing and recording arts, it has been known for some years to deliver ink to the printing or recording pen through small conduits. More particularly, this type of ink delivery system has found special application in ink jet printers and in capillary-type recording pens. In such systems, it occasionally occurs that gases evolve from the ink during operation or during periods of shutdown which can cause flow reductions or outright blockage of ink flow during subsequent operation. Also, the ink may evaporate away from the ink jet or pen outlet, so that the writer is not ready to perform when just actuated, but must await movement of ink back to the outlet. Numerous attempts have been made to overcome the problem of gas evolution in the printing ink by means such as improved ink chemistries and various apparatus for removing gas bubbles from the ink as they form. Various caps have been provided to reduce evaporation. While these approaches have achieved a degreee of success, a need has continued to exist for a simple, reliable priming system which can be used to ensure that the ink lines leading to the ink jet or other pen are filled with ink and free of air bubbles at the time the printer is started.

OBJECTS OF THE INVENTION

The primary object of the invention is to provide a simple, improved priming apparatus for use with ink jet and capillary recording pens or similar writing or printing instruments.

A further object of the invention is to provide such an apparatus which combines the function of the droplet charging ring used in ink jet printers during printing with the further function of drop removal from the ink jet during priming.

Yet another object of the invention is to provide such an apparatus in which ink may be forced through the priming system by operation of a simple plunger pump which also produces the negative pressure necessary to draw away ink collected from droplets formed at the ink jet or pen outlet.

A still further object of the invention is to provide such an apparatus in which any solid material clogging the conduit to the ink jet or pen may be back flushed into the ink supply bottle.

Another object of the invention is to provide such an apparatus which embodies a simplified pressure relief valve for ensuring that the ink jet or other pen is not overpressurized during the priming operation.

Still another object of the invention is to provide an apparatus in which the ink collection container is electrically isolated from the charging ring and ink jet controls to prevent inadvertent grounding of the ink jet controls during operation.

The above objects of the present invention are given only by way of example. Thus, other advantages and desirable objects inherently achieved by the disclosed structure may occur to those skilled in the art. Nonetheless, the scope of the invention is to be limited only by the appended claims.

SUMMARY OF THE INVENTION

The above objects and other advantages are achieved by the disclosed priming apparatus for use with liquid ink writing instruments. The priming apparatus comprises in one embodiment a source of ink for the recorder or printer which is connected to a conduit for delivering ink to the recorder or printer. A pumping device is provided which causes ink to flow into the conduit from the source. As ink is forced from the writing instrument under pressure, the ink droplets are drawn away through an adjacent orifice by capillary action. The ink thus removed is then returned to the supply reservoir by applying a vacuum to the orifice. A simplified plunger pump serves to both pressurize ink so that it flows through the writing instrument outlet and to create a region of low pressure which draws the ink away from the orifice in use. The pump embodies a unique pressure relief valve which ensures that excessive pressure is not applied to the writing instrument during priming operation. In ink jet applications, the conventional charging ring of the ink jet printer is modified by forming the ring from a loop of electrically conductive wire which comprises radially extending end segments, the end segments being held in laterally spaced relation to define a flow channel therebetween. A conduit slipped over the end segments restrains them and provides a continuation of the flow channel into which the droplets are withdrawn during priming. If the flow channel is held at a subatmospheric pressure during ink jet printing, satellite or stray drops are removed.

DETAILED DESCRIPTION OF THE PREFERRED EMBODIMENTS

There follows a detailed description of preferred embodiments of the invention, reference being made to the drawings in which like reference numbers identify like elements of structure in each of the several Figures.

Figure 1:
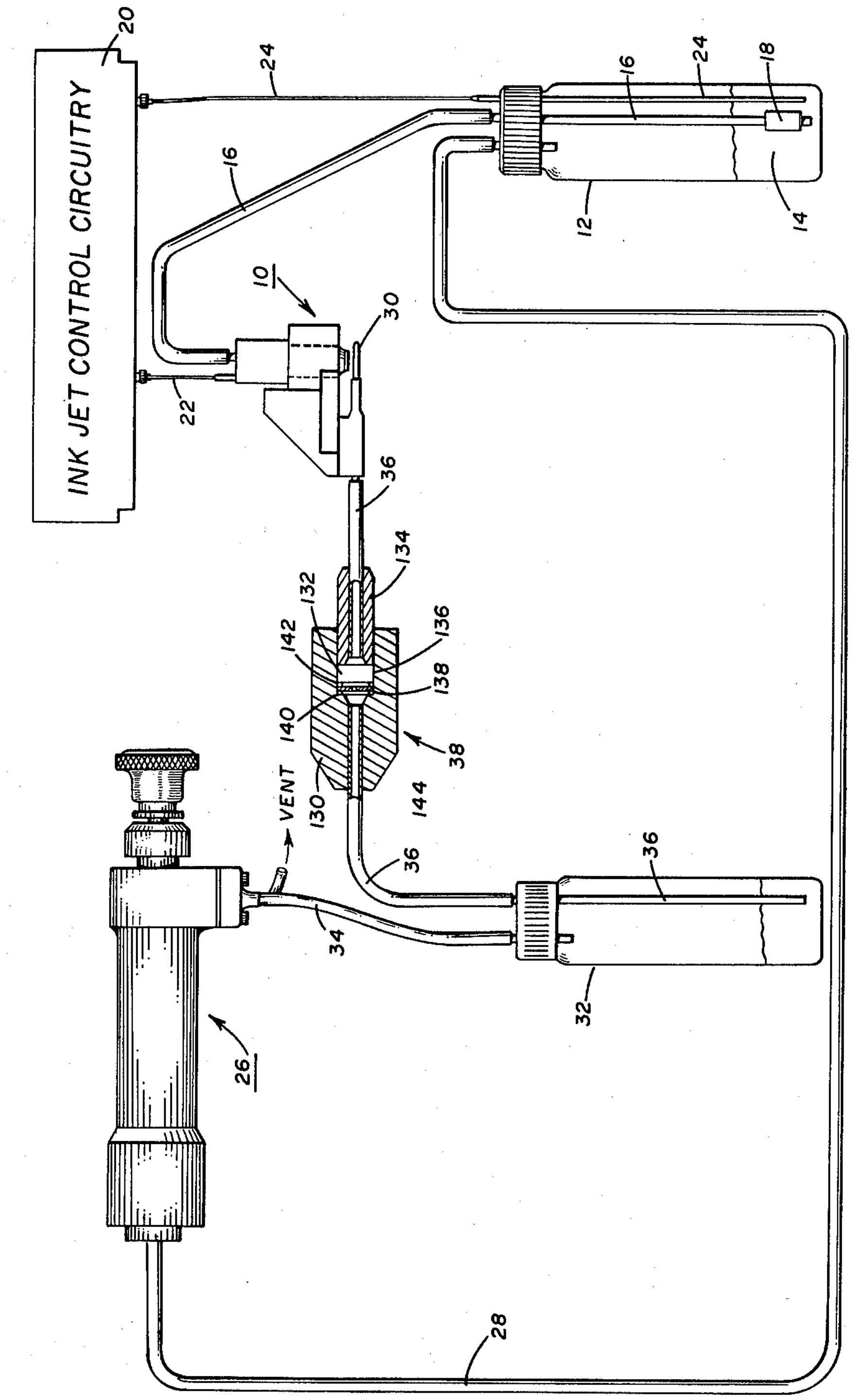
FIG. 1 shows a schematic view of a priming system according to the present invention, as particularly configured for application to an ink jet printer.

With reference to FIG. 1, an apparatus according to the invention is illustrated schematically. Means for applying ink to a suitable medium are provided such as an ink jet printing head 10 of the type disclosed in U.S. Pat. Nos. 3,902,083 and 3,840,758, illustrated schematically; however, those skilled in the art will recognize that a capillary pen could also be used. In operation of an ink jet type printer, droplets are emitted from the printing head and then passed through electrical deflection circuitry of a type known in the art before impinging upon the recording medium (not shown) in the desired pattern to form alphanumeric characters. In a capillary printing system, the pen physically contacts the recording medium; however, delivery to the pen is via a thin capillary-type conduit in a manner somewhat similar to that used in ink jet printers. A source of ink 12 such as a capped bottle is provided which holds a quantity of ink 14 in its lower portion. A conduit 16 extends from printing head 10 to source 12 and down into source 12 to a location below the upper surface of the ink. Preferably, a filter 18 is provided at the lower end of conduit 16 to prevent particulate matter from reaching and potentially clogging the printing head.

Control circuitry 20 is provided in ink jet applications which charges and deflects the ink drops as necessary to form desired alphanumeric characters in accordance with techniques now well known in the art. Circuitry 20 is connected to the ink jet printing head 10 by means of a conductor 22 and to ink source 12 by means of a conductor 24 which extends down within source bottle 12 into the ink 14 so as to establish proper electrical continuity between the ink and the associated driving and deflection circuitry.

A priming pump 26 is used to pressurize source bottle 12 via a conduit 28, to cause ink to flow to the pen or printing head. Ink forced through the ink jet printing head or other pressurized writing instrument during priming operations is collected by an element such as a priming collector ring 30 which is located just below the ink jet or other writing instrument. The collector ring comprises a central bore having at least one orifice located in its side walls through which droplets of ink issuing from the ink jet or other writing instrument are withdrawn during priming operations. The details of priming collector ring 30 will be discussed in greater detail with respect to FIGS. 3, 3*a* and 3*b*. As pump 26 pressurizes source bottle 12, it simultaneously applies a subatmospheric pressure to an ink collector bottle 32 via a conduit 34. A further conduit 36 extends down into collector bottle 32 to a location below the surface of the ink therein. Conduit 36 is connected via a flow control element 38 to the priming collector ring 30. Because conduits 34 and 36 are separated by the air space in collector bottle 32, no electrical path exists between collector ring 30 and pump 26, which is at ground potential.

The system illustrated in FIG. 1 operates generally as follows. If it is desired to expel any air trapped in the lines leading from source bottle 12 to ink jet 10, the plunger on pump 26 is first withdrawn to the right as illustrated to expel air from one side of the pump piston. The plunger is then moved toward the left thereby pressurizing the air in line 28 and source bottle 12 so as to force ink upward through conduit 16 and out of the ink jet or other writing instrument. As a drop of ink forms at the ink jet, it is drawn away by the orifice located in priming collector ring 30 and carried through the flow control element 38 to collector bottle 32.

Figure 2:
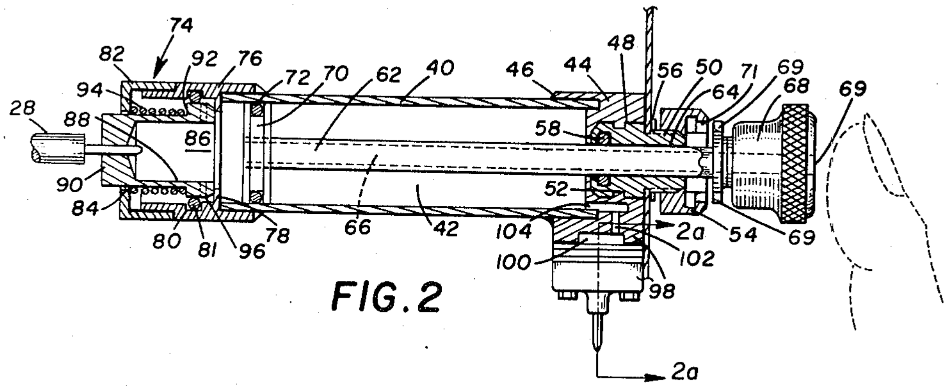
FIG. 2 shows a section view of the unique priming pump according to the invention.
Figure 2A:
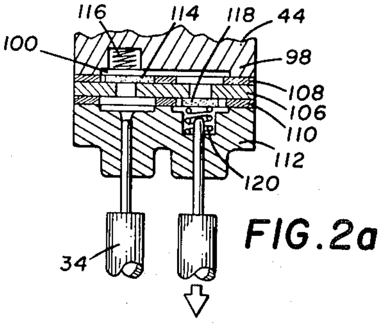
FIG. 2*a* shows a view taken on line a—a of FIG. 2 indicating the details of the inlet and outlet valves for the priming pump.

Turning now to FIGS. 2 and 2*a*, the structure and operation of the priming pump according to the invention may be understood. Priming pump 26 comprises a cylinder 40 having a longitudinal bore 42 therethrough which is closed at one end by an end cap 44 secured to cylinder 40 by means 46 such as suitable adhesive, solder, braze, weld or the like. A central bore 48 is provided in plastic end cap 44 which retains a metal seal assembly 50 by means such as a molded joint 52. A retaining and locking nut 54 and a lock washer 56 secure pump 26 to the adjacent face plate. A lubricated O-ring 58 is captured in a suitable annular recess located on the inside diameter of seal assembly 50. Within seal assembly 50, a shaft or plunger rod 62 is slidably mounted in bore 64. A longitudinal passageway 66 is provided in shaft 62, passageway 66 extending from end to end of shaft 62 and also through actuator knob 68 affixed to the exterior of shaft 62 through thumb port 69. Knob 68 includes radially extending locking tabs 69 which may be pushed into and rotated within an annular recess 71 within locking nut 54, whereby piston 70 may be prevented from moving outwardly. On the opposite end of shaft 62, a piston 70 is provided through which longitudinal passageway 66 also extends until it reaches the other side of the piston. The opposite sides of piston 70 are pneumatically sealed from each other by means such as a lubricated O-ring 72.

The opposite end of pump 26 is closed by a hollow end cap 74 attached to cylinder 40 by suitable means 46 as previously described. End cap 74 comprises a hollow, cylindrical valve body 76 having a radially inwardly projecting flange 78 which abuts the end of cylinder 40. An annular seal recess 80 is provided on the inside diameter of valve body 76, within which a lubricated O-ring 81 is provided. End cap 74 also comprises a valve cap 82 which is suitably attached to valve body 76 by any convenient means. Cap 82 includes an annular pressure-relief opening 84. Located within the combination of valve body 76 and valve cap 82 is a hollow, cylindrical valve piston 86 having a cylindrical wall portion 88 and an end wall portion 90 pierced by a pump outlet opening which is connected to conduit 28 via a suitable fitting. Cylindrical wall portion 88 and end wall portion 90 extend loosely through pressure relief opening 84 to the exterior of pump 26. Piston 86 also comprises an outwardly, radially extending seal flange portion 92 which is sized to sealingly engage ring 81. A spring 94 is captured between valve cap 82 and flange 92 so that piston 86 is biased toward the inlet of end cap 74, into contact with inwardly projecting flange 78. At least one radial pressure relief passage 96 is provided through the walls of piston 86. Passage 96 normally communicates with the high pressure side of seal 81 so that no fluid flow is permitted therethrough. That is, all fluid leaving pump 26 goes out through conduit 28 so long as passage 96 remains on the high pressure side of seal ring 81.

The structure described thus far operates as follows. When it is desired to prime the ink jet or other writing instrument, the user withdraws piston 70 to the right as illustrated in FIG. 2 using actuator knob 68. During this movement, care is taken not to block thumb port 69 at the outer end of passageway 66, so that the volume to the left of piston 70 remains at atmospheric pressure. If thumb port 69 remains closed during rightward movement of piston 70, line 28 will be backflushed into bore 42. This technique is sometimes useful to remove the obstructions from the ink jet or pen. Then the user places his thumb or finger over port 69, as illustrated schematically in FIG. 2, and presses piston 70 toward the left. As the pressure builds in the interior of valve piston 86, it may eventually reach such a magnitude that piston 86 will begin to move toward the left against the bias of spring 94. If piston 86 moves sufficiently far, relief passages 96 will eventually pass seal ring 81 thereby permitting flow of air through passages 96, along the exterior of piston 86 and out through pressure relief passage 84.

FIG. 2*a* illustrates the inlet and outlet flow control valves of pump 26. End cap 44 also comprises a radially projecting boss 98 within which a plenum 100 is provided which communicates with bore 42 via a radial passageway 102 and an axial passageway 104. A perforated valve plate 106 is held in position relative to the boss 98 between a pair of perforated seal 108,110, by means of a manifold cap 112. An inlet valve 114 is seated against plate 106 on the cylinder side of valve plate 106 by means of a spring 116. An outlet valve 118 is seated against valve plate 106 on the manifold cap side of the valve plate by means of a spring 120. In operation, as piston 70 is drawn toward the right as illustrated in FIG. 2, the pressure rises in plenum 100 so that valve 118 is moved downward against the action of spring 120 thereby permitting air to flow around the valve element and out through the illustrated vent. Appropriate stops are provided to prevent blockage of the vent passage. On the other hand, as piston 70 is moved back toward the left as illustrated in FIG. 2, the piston tends to draw a vacuum in cylinder 40 so that the valve element 114 is lifted from its seat against the action of spring 116 thereby drawing air into the pump through conduit 34.

Figure 3B:
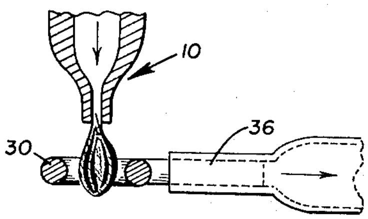
FIGS. 3, 3*a*, and 3*b* respectively show top, side, and sectional views of the combined charging ring and droplet withdrawal orifice structure according to the present invention.
Figure 3:
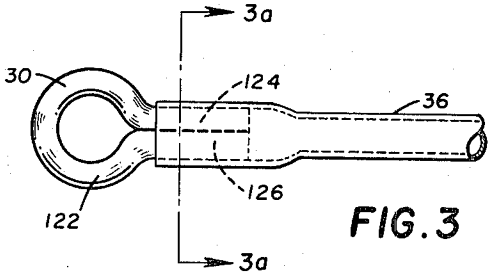
Figure 3A:
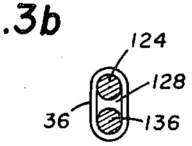

Turning now to FIGS. 3, 3*a*, and 3*b*, the structure and function of priming collector ring 30 may be understood. Ring 30 preferably comprises a loop 122 of electrically conductive wire, when the priming system is intended for use with the ink jet printer. Loop 122 has radially extending ends 124, 126, which are held in laterally spaced relationship by a suitable clamp or by a deformed extension of conduit 36, thereby defining a capillary flow channel or orifice 128 therebetween. As shown in 3*b*, a droplet forms and enlarges over ink jet printing head 10 until it contacts priming collector ring 30; and then, due to the capillary action of flow channel 128, the droplet is drawn laterally from priming collector ring 30. The subatmospheric pressure in conduit 36 then causes the liquid to return to collection bottle 32. In practice, a loop diameter of appproximately 0.025 in. I.D. has been found to be suitable in ink jet applications. Those skilled in the art will appreciate that in applications where a capillary pen is used, the ring 30 need not be made from an electrically conductive material. In addition, it is within the scope of the invention to provide a ring made with several segments each having radially extending ends which define additional flow channels therebetween. Moreover, by constantly applying a vacuum to orifice 128 during ink jet printing as well as priming, stray or satellite drops are removed.

Referring again to FIG. 1, the structure and function of flow controller 38 may be understood. Controller 38 functions during the operation of the device to regulate the flow rate through conduit 36 during priming so that the time negative pressure appears at orifice 128 is increased sufficiently to ensure the priming drop is drawn away completely. Controller 38 comprises an essentially cylindrical housing 130 having an inside bore 132 which receives an inlet fitting 134. Fitting 134 extends within bore 132 sufficiently to bear against a small cylindrical filter 136 which in turn bears against an orifice plate 138 mounted between O-rings 140,142. Finally an outlet fitting 144 connects the flow controller 38 to the continuation of conduit 36.

Having described my invention in sufficient detail to enable those skilled in the art to make and use it, I claim:

1. An improved pressure relief valve, comprising:
   - a housing having an inlet opening and a pressure relief opening;
   - a piston slidably located in said housing wherein said pressure relief opening is axially aligned with said piston and said piston extends loosely through said pressure relief opening;
   - means for biasing said piston toward said inlet opening;
   - seal means between said piston and said housing for normally preventing fluid flow therebetween;
   - passage means located in said piston for connecting inlet pressure to said pressure relief opening upon movement of said piston through a predetermined distance against the action of said biasing means; and
   - an outlet passage through said piston.

* * * * *